Dec. 26, 1950     C. H. VIDAL     2,535,105
COLLET AND CHUCK JAWS
Filed June 30, 1947     2 Sheets-Sheet 1
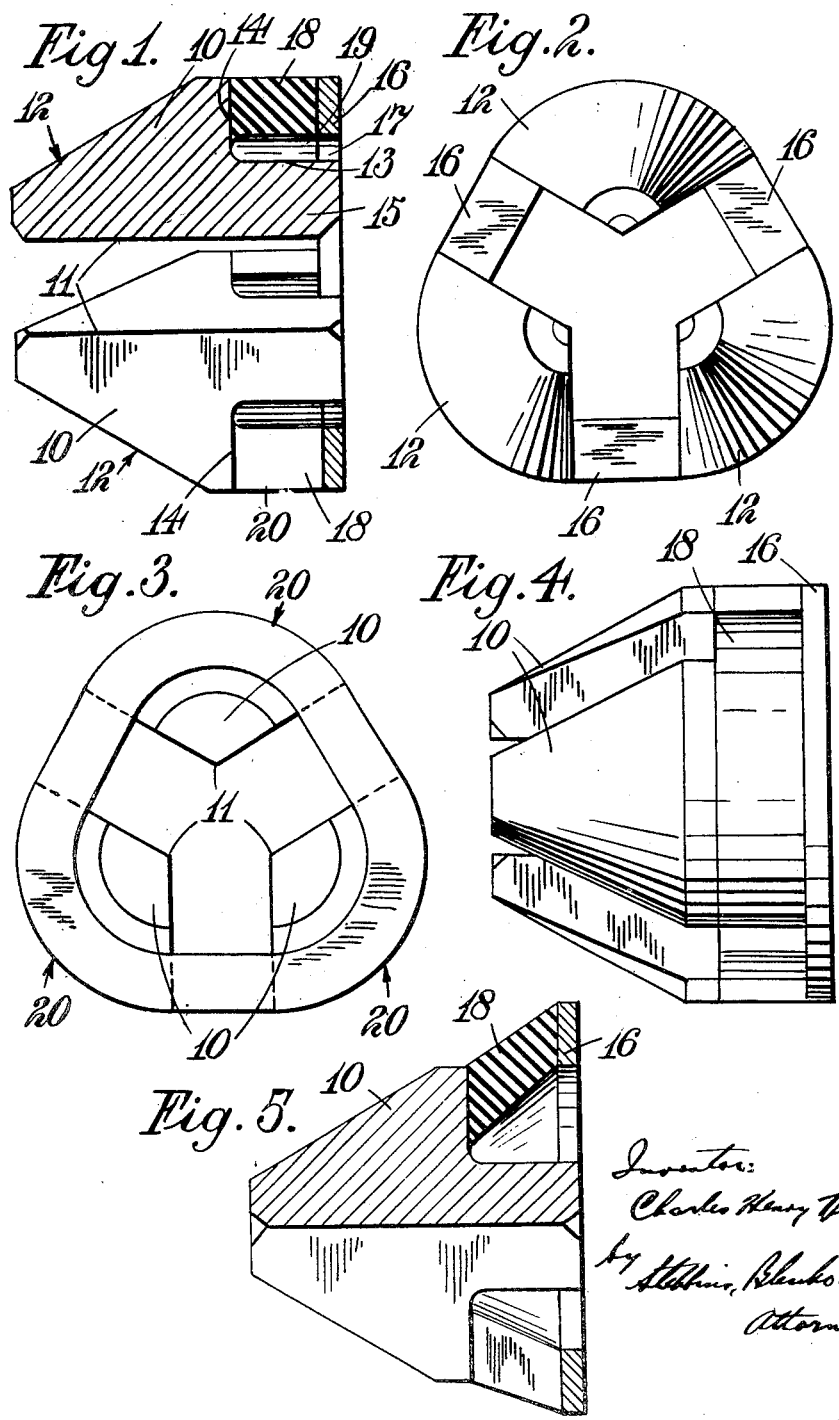

Dec. 26, 1950 C. H. VIDAL 2,535,105
COLLET AND CHUCK JAWS
Filed June 30, 1947 2 Sheets-Sheet 2
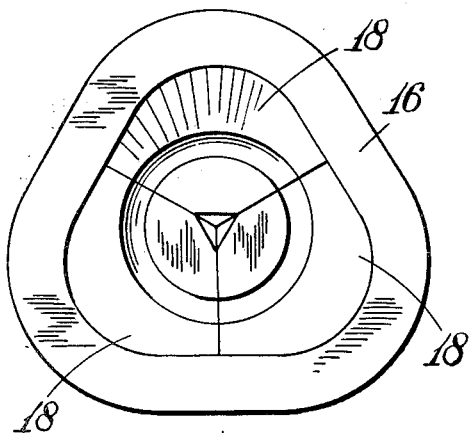
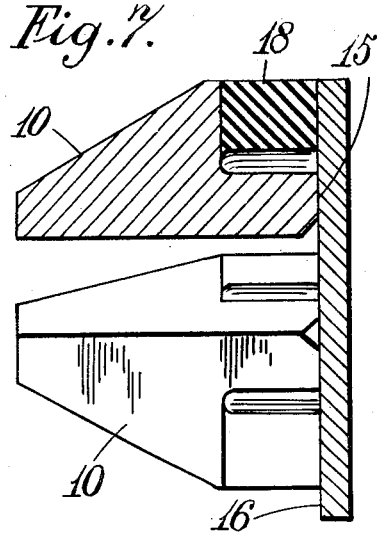
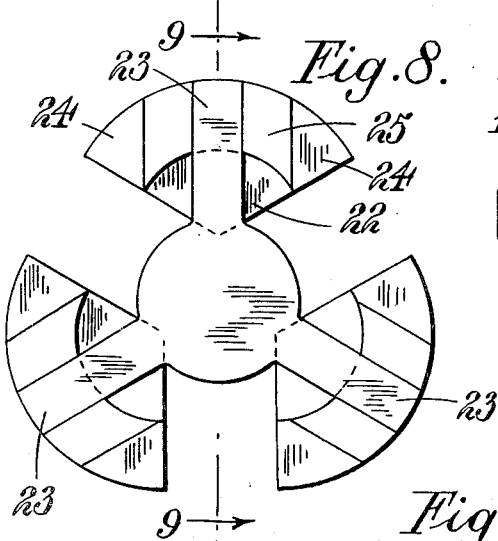
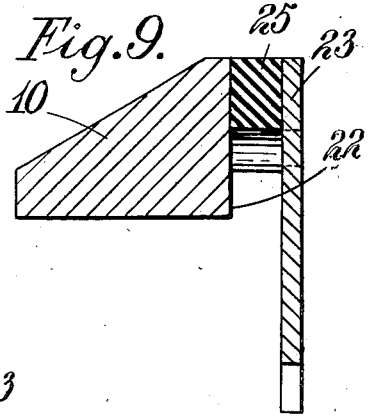
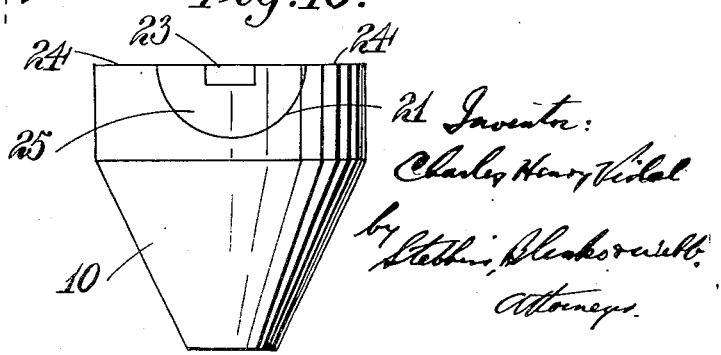

Patented Dec. 26, 1950

2,535,105

UNITED STATES PATENT OFFICE 2,535,105

COLLET AND CHUCK JAWS

Charles Henry Vidal, London, England; Eileen Mavis Vidal executrix of said Charles Henry Vidal, deceased Application June 30, 1947, Serial No. 758,164
In Great Britain November 15, 1946

9 Claims. (Cl. 279—46)

This invention relates to collets and chuck jaws and has for an object to provide means whereby the gripping portions of the collet or jaws may be resiliently mounted in relation to one another while being circumferentially separated from one another by gaps, thus permitting considerable freedom of movement between them. It has previously been proposed to form a collet by interconnecting the gripping members by resilient material so as to fill the gaps between the members and thus form a circumferentially continuous element.

According to this invention a collet or unit assemblage of jaws for a chuck comprises a number of jaws connected to a back plate or body part by non-metallic resilient material so as to permit movement of the jaws towards and away from the axis of rotation of the chuck. For example, each jaw is shaped to provide a face transverse to its gripping edge and to the axis of rotation of the chuck and inset from the end of the jaw, a back plate or body part disposed facing said transverse face, and resilient material is connected between said transverse face and said back plate or body part.

In one construction according to this invention, the rear end of each jaw is cut away to form a recess which is bounded by a face parallel or nearly parallel to the face of the back plate or body part, and a rubber or rubber substitute (hereinafter referred to as rubber) connecting piece is arranged in each said recess and bonded to said two faces.

Preferably, the recess extends inwardly from the outer face of each jaw, so that as the jaws are forced inwardly, the rubber moves away from the bottom of the recess. The rubber is thus placed in shear and tension.

The back plate may be in the form of a disc or flat-faced ring, in which latter case the base of each jaw may be arranged to project into said ring and have its end face in the same plane as the rear face of the ring or slightly beyond it, while in the former case the end faces of the jaws may slidably engage the face of the disc.

In an alternative construction, the rear end face of each jaw is provided with a part-cylindrical recess arranged with its axis radial to the axis of the chuck, and wherein said back plate or body part comprises a spider with arms extending along said recesses and having resilient material connected between them and the cylindrical surfaces.

As previously indicated, an important feature of the invention consists in that the gaps between the side faces of adjacent jaws are left unfilled.

The following is a description of three alternative embodiments of the invention, reference being made to the accompanying drawings, in which—

Figure 1 is a longitudinal section through the jaw assemblage, with the jaws in an open position;

Figure 2 is a front elevation of the jaw assemblage;

Figure 3 is a rear elevation of the jaws assemblage;

Figure 4 is a side elevation of the assemblage;

Figure 5 is a similar view to Figure 1 showing the jaws in a closed position;

Figure 6 is a rear elevation of the assemblage with the jaws in a closed position;

Figure 7 is a similar view to Figure 1 of an alternative assemblage;

Figure 8 is a rear elevation of another form of jaws assemblage;

Figure 9 is a section on the line 9—9 of Figure 8; and

Figure 10 is a plan view of the uppermost jaw assemblage shown in Figure 8.

Referring to the arrangement shown in Figures 1 to 6, there are provided three jaws 10 the front part of each of which is sector-shaped in cross-section and each has an axially-extending inner gripping edge or face 11 and an outer conical face 12 which is arranged to be engaged by an internal conical face of the chuck. Relative longitudinal movement between the conical faces thus causes radial movement of the jaws. The rear end of each jaw is cut away so as to provide a gap bounded by a part-cylindrical face 13 and a flat transverse face 14. The rear end of each jaw terminates in a flat end face 15. The cut-away portions of the jaws project into a flat-faced ring 16, leaving a space 17 between them and it. There is secured between the transverse face 14 of each jaw and the ring 16 a separate block 18 of resilient material such as "rubber." Each of the blocks is provided with an inner part-cylindrical surface 19 which is spaced away from the part-cylindrical surface 13 of each jaw. Each block is also provided with flat end faces which are bonded respectively to the flat transverse face 14 of a jaw and the flat face of the ring. The remaining outer face 20 of each block is so shaped as initially to be part-cylindrical. With this arrangement, as each jaw is forced inwardly, the "rubber"

block distorts in the manner best seen in Figures 5 and 6. The contour of the ring is non-circular, and the shape of which is best seen in Figure 6.

The spacing away of the inner cylindrical surfaces 19 of each block and the cylindrical surfaces 13 of the jaws enables the blocks to be moulded and bonded in situ, a suitable spacing member being provided in the mould.

In the arrangement shown in Figure 7, the ring 16 of the previous construction is replaced by a disc 16 against which the flat end faces 15 of the jaws abut, and thus, as the jaws are forced inwardly, these faces slide on the face of the disc.

In the arrangement shown in Figures 8 to 10, the rear end face of each jaw is provided with a semi-cylindrical recess 21 extending radially inwards from the outer edge of the jaw and meeting an undercut portion having a flat face 22. In place of the ring or disc of the previously described constructions, there is provided a spider member having three radial arms 23 which are rectangular in cross-section and extend through and are spaced away from the semi-cylindrical faces of the recesses. The rear faces of the arms are arranged flush with or slightly proud of the rear faces 24 of the jaws. Rubber inserts 25 are bonded to the sides and front faces of the spider arms and to said semi-cylindrical surfaces. Each insert terminates at the boundary between the semi-cylindrical surface and the flat face 22.

In yet a further embodiment of the invention, instead of the jaws being connected by the resilient block to a ring or disc they may be connected to the body part of a chuck.

I claim:

1. A unit assemblage of jaws for a chuck comprising a body part, a number of jaws extending away from a face of the body part and grouped around an axis transverse to said face and non-metallic resilient material connecting to said face of the body part those faces of the jaw which are arranged opposite it so as to permit movement of the jaws towards and away from said axis.

2. A unit assemblage of jaws for a chuck comprising a body part, a number of jaws extending away from a face of the body part and grouped around an axis transverse to said face, each of which jaws is provided with a gripping edge and a face inset from the end of the jaw and transverse to said edge and arranged opposite the face of the body part and non-metallic resilient material connecting said inset faces of the jaws to the face on said body part, so as to permit movement of the jaws towards and away from said axis.

3. A unit assemblage of jaws for a chuck comprising a body part, a number of jaws extending away from a face of the body part and grouped around an axis transverse to said face, each of which jaws is provided with a gripping edge and a face inset from the end of the jaw and disposed parallel with the face of the body part and a separate rubber portion bonded between the inset face of each jaw and the face of said body part, so as to permit movement of the jaws towards and away from said axis.

4. A unit assemblage of jaws for a chuck comprising a body part, a number of jaws extending away from a face of the body part and grouped around an axis transverse to said face, each of which jaws is provided with a gripping edge and a face inset from the end of the jaw on a part thereof remote from said axis, which inset face is disposed parallel with the face of the body part and a separate rubber portion bonded only between the parallel faces of each jaw and said body part so as to permit movement of the jaws towards and away from said axis.

5. A unit assemblage of jaws for a chuck comprising a flat faced plate, a number of jaws extending away from the face of said plate and grouped around an axis transverse thereto, each of which jaws is provided with an end face disposed opposite the face of said plate, and a separate rubber portion bonded between the end face of each jaw and said plate leaving the other faces of the jaws unconnected so as to permit movement of the jaws towards and away from said axis.

6. A unit assemblage of jaws for a chuck comprising a flat faced plate, a number of jaws abutting and extending away from the face of said plate and grouped around an axis transverse thereto, each of which jaws has a face inset from the abutting portion thereof, and a separate rubber portion bonded between the inset face of each jaw and said plate leaving the other faces of the jaws unconnected so as to permit movement of the jaws towards and away from said axis.

7. A unit assemblage of jaws for a chuck comprising a ring, a number of jaws extending away from said ring and grouped around an axis transverse thereto, each of which jaws has a face inset from the end thereof so as to provide a part which projects into the ring while the inset face is arranged opposite the face of the ring and a separate rubber portion bonded between the inset face of each jaw and the opposed face of the ring leaving the other faces of the jaws unconnected so as to permit movement of the jaws towards and away from said axis.

8. A unit assemblage of jaws for a chuck comprising a spider member having a number of radiating arms, a jaw arranged opposite each jaw and extending away from the spider member and grouped around the axis from which said arms radiate, a recess in the end face of each jaw in which a spider arm is located and a separate rubber portion bonding the faces of each recess to an arm of said spider.

9. A collet comprising a back plate, a number of jaws separate from and extending away from the back plate and grouped about an axis normal thereto and having end faces bonded by rubber to the back plate leaving all the other faces of jaws unconnected.

CHARLES HENRY VIDAL.

REFERENCES CITED

The following references are of record in the file of this patent:

UNITED STATES PATENTS

| Number | Name | Date |
|---|---|---|
| 494,631 | Fleurant | Apr. 4, 1893 |
| 1,923,283 | Stoker | Aug. 22, 1933 |
| 2,035,925 | Seamark | Mar. 31, 1936 |
| 2,264,480 | Owen | Dec. 2, 1941 |
| 2,346,706 | Stoner | Apr. 18, 1944 |